(12) United States Patent
Akiba

(10) Patent No.: US 6,339,896 B1
(45) Date of Patent: Jan. 22, 2002

(54) INTER-LINE FISHING ROD

(75) Inventor: Masaru Akiba, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 627 days.

(21) Appl. No.: 08/845,282

(22) Filed: Apr. 20, 1997

Related U.S. Application Data

(63) Continuation of application No. 08/470,446, filed on Jun. 6, 1995, now abandoned, which is a continuation of application No. 08/091,064, filed on Jul. 14, 1993, now Pat. No. 5,488,797.

(30) Foreign Application Priority Data

Apr. 17, 1992 (JP) ............................................. 4-32110
Jul. 14, 1992 (JP) ............................................. 4-55249

(51) Int. Cl.$^7$ ......................... A01K 87/04; A01K 87/00
(52) U.S. Cl. ............................................ 43/18.1; 43/24
(58) Field of Search .............................. 43/18.1, 18.5, 43/24

(56) References Cited

U.S. PATENT DOCUMENTS

| | | | |
|---|---|---|---|
| 2,578,663 A | | 12/1951 | Beaupre |
| 2,808,676 A | | 10/1957 | Major |
| 3,088,239 A | | 5/1963 | Weaver |
| 3,727,338 A | | 4/1973 | Pedersen |
| 3,789,533 A | | 2/1974 | Bowerfind et al. |
| 3,862,509 A | | 1/1975 | Petersen, Jr. |
| 4,141,132 A | * | 2/1979 | Ohmura ........................ 43/24 |
| 4,212,126 A | | 7/1980 | Barnett |
| 5,159,776 A | | 11/1992 | Horton et al. |
| 5,175,952 A | | 1/1993 | Yamato |
| 5,245,779 A | | 9/1993 | Suzue et al. |
| 5,299,377 A | | 4/1994 | Akiba |
| 5,381,619 A | | 1/1995 | Watkins |
| 5,488,797 A | * | 2/1996 | Akiba ........................ 43/18.1 |

FOREIGN PATENT DOCUMENTS

| | | | | |
|---|---|---|---|---|
| FR | 1541807 | * | 10/1968 | |
| FR | 2123967 | | 9/1972 | |
| GB | 1209513 | * | 10/1970 | ................... 43/24 |
| JP | 51-6072 | | 2/1976 | |
| JP | 56-127032 | | 10/1981 | |
| JP | 63-49426 | | 3/1988 | |
| JP | 63-34525 | | 9/1988 | |
| JP | 63-169871 | | 11/1988 | |
| JP | 1165328 | * | 6/1989 | |
| JP | 63136348 | * | 12/1989 | |
| JP | 3-61030 | | 3/1991 | |
| JP | 4-341133 | | 11/1992 | |
| JP | 5-88259 | | 12/1992 | |

* cited by examiner

Primary Examiner—Kurt Rowan
(74) Attorney, Agent, or Firm—Liniak, Berento, Longacre & White

(57) ABSTRACT

An inter-line fishing rod in which a fishing line is introduced into the inside of the rod and laid therein in the longitudinal direction of the rod. The rod is made up of a plurality of tubular members jointed together. The inside circumferential surface of the tubular member is constituted by a coating film made of water-repelling fluoroplastics to smoothly guide the passing fishing line.

49 Claims, 2 Drawing Sheets

INTER-LINE FISHING ROD

CROSS-REFERENCE TO PRIOR U.S. APPLICATION

This is a continuation of application Ser. No. 08/470,446, filed Jun. 6, 1995, which was abandoned upon the filing hereof. Which is a continuation in part of application Ser. No. 08/091,064, filed Jul. 14, 1993 now U.S. Pat. No. 5,488,797.

BACKGROUND OF THE INVENTION

The present invention relates to an inter-line fishing rod in which a fishing line is introduced into the inside of the fishing rod and laid therein in the longitudinal direction of the rod.

An inter-line fishing rod is used for such purposes that a fishline is prevented from tangling on an obstacle around a fishing site, loosening between fishline guides and tangling on the guide.

The Japanese Utility Model Application (OPI) No. 169871/88 (the term "OPI" as used herein means an unexamined published application") discloses an inter-line fishing rod in which the inside circumferential surface of each tubular member is constituted by a ceramic fiber layer to enhance the wear resistance of the surface.

According to this proposal, the wear resistance of the inside circumferential surface of each tubular member of the inter-line fishing rod may be enhanced. However, the frictional resistance of the surface is increased to make it difficult for a user to introduce the fishline into the inside the rod. Particularly if the fishline is wet with water, the frictional resistance of the surface so high that the fishline cannot smoothly be put into and out of the rod. It was also found out by the present inventors that the smoothness of the passing fishing line was hindered by water drop inside the rod. That is, resistance is caused on the passing fishing line due to friction between the water drop and the inner circumferential surface of the rod, friction between the water drop and the fishing line and surface tension of the water drop, other than friction between the inner circumferential surface and the fishing line.

SUMMARY OF THE INVENTION

The present invention was made in order to solve the problems described above.

Accordingly, it is an object of the invention to provide an inter-line fishing rod into and out of which a fishline can pass smoothly even if it is wet with water.

In order to attain the above-noted and other objects, the present invention provides a fishing rod formed by a prepreg made of a synthetic resin and high-strength fibers impregnated with the resin, in which a coating film layer made of a water-repelling substance low in coefficient of friction is provided to constitute the inside circumferential surface of the rod. Since the inside circumferential surface of each tubular member of the fishing rod provided in accordance with the present invention is constituted by the coating film layer made of the water-repelling substance low in coefficient of friction, the frictional resistance of the member to the fishline is so low that it can be smoothly guided in the member to be put into and out of it.

To form the coating film layer for each tubular member of the rod, a woven or non-woven fabric made from fluoroplastic fibers, silicone fibers or the like and impregnated with resins, a sheet or tape of fluoroplastics, silicone resins or the like, or a coating paint of fluoroplastics, silicone resins or the like, or of a mixture of epoxy resins and fine grains or particles of fluorine, silicon or the like which are $10\mu$ or less in diameter, can be used as material. The thickness of the coating film layer is $500\mu$ or less, preferably 20 to $200\mu$. In addition, the thickness of the coating film layer is not restricted to the above-noted range, and may be less than $20\mu$.

DETAILED DESCRIPTION OF THE PREFERRED EMBODIMENTS

Preferred embodiments of the present invention will now be described with reference to the drawings attached hereto.

Figure 1:
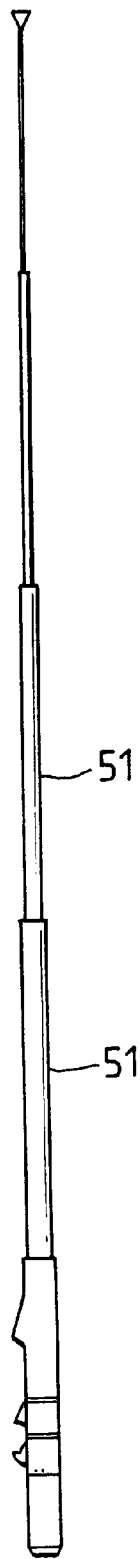
FIG. 1 is a side view of a fishing rod which is an embodiment of the present device.
Figure 2:
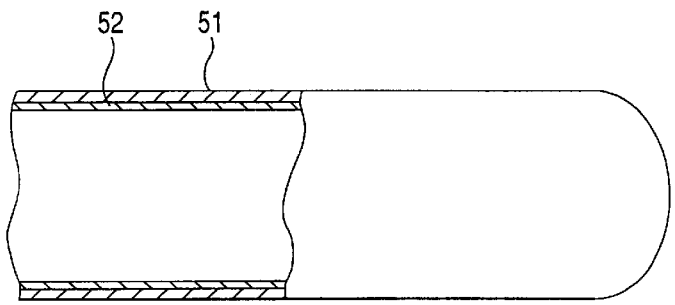
FIG. 2 is a cutaway side view of the rod shown in FIG. 1.
Figure 3:
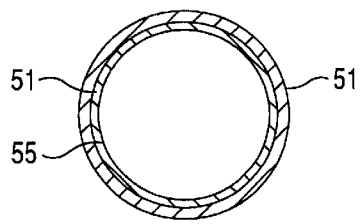
FIG. 3 is a cross-sectional view of the rod shown in FIG. 1.

FIGS. 1, 2 and 3 show an inter-line fishing rod which is an embodiment of the present invention.

The fishing rod includes tubular members 51, each of which is made of a wound prepreg formed by impregnating high-strength fibers with thermosetting resins such as epoxy resins. As the high-strength fibers, carbon fibers, boron fibers, glass fibers, and aramid fibers are employable. Further, ceramic fibers and metal fibers are usable as the high-strength fibers if the high wear-resistance is required for a product.

The fishing rod of the invention further includes a coating film layer 52 provided on the inside surface of each tubular member 51 to constitute the inside circumferential surface of the rod. The coating film layer 52 is preferably formed of fluoroplastics (or fluorine-contained polymers), silicone resins, high density polyethylene resins and synthetic waxes, which provide water repelling property and low frictional coefficient. In addition, the high-strength fibers 55 may be mixed into the coating film layer, and further the high-strength fibers thus mixed may be partially exposed from the coating film layer to the inside of the rod. In this case, the orientation of the mixed high-strength fibers is preferably longitudinal, but they may extend circumferentially or spirally with respect to the tubular member 51.

One example of a method of manufacturing each of the tubular members 51 is described as follows: a separating agent is first applied to a mandrel, and a fluoroplastic paint for making the coating film layer 52 is then applied to the agent. After the agent and the paint have dried spontaneously, the prepreg made of thermosetting synthetic resins such as epoxy resins and high-strength fibers impregnated with the resin is wound around the agent and the paint on the mandrel, and a tape is then wound around them. The assembly of these materials is then subjected to a thermosetting treatment so that the tubular member is formed. After that, the tape and the mandrel are removed from the prepreg, so that the tubular member 51 having the coating film layer 52 integrally provided on the inside circumferential surface thereof is manufactured. Instead of the fluoroplastic paint, a tape, a sheet or a woven or non-woven fabric may be wound around the mandrel. Further, the paint or the like may be applied to a surface of the prepreg by coating, spraying, dipping, pressure-depositing, plating, or other physical vapour-depositing. Moreover, after the prepreg is thermoset to form a tubular member having no coating film layer, the paint may be applied to the inner circumferential surface of the thermoset tubular member by spraying, coating, plating, or other physical vapour-depositing.

Since the coating film layer 52 is made of a water-repelling substance low in coefficient of friction, the frictional resistance of the film layer to the fishline is so low that the fishline can be smoothly guided in each of the tubular members 51 to be put into and out of it, even if the fishline is wet with water.

Figure 4:
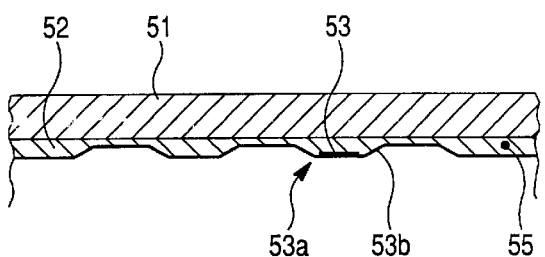
FIG. 4 is a longitudinally sectional view of a fishing rod which is a modification of the embodiment shown in FIG. 1.
Figure 5:
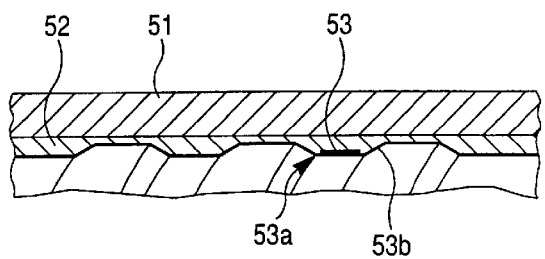
FIG. 5 is a longitudinal sectional view of an alternate embodiment of FIG. 4.

Although the thickness of the coating film 52 is uniform in the embodiment, the present invention is not confined thereto but may be otherwise embodied so that a coating film 52 having inner annular projections 53 as shown in FIG. 4 is provided to have a smaller area of contact with the fishline than the former coating film. Corner portions 53a and 53b of the annular projection are preferably rounded as viewed in section. The longitudinal length of the annular projection 53 may be set larger than the longitudinal distance between the adjacent annular projections 53 so that the coating film 52 presents a contour in section as having annular grooves. Moreover, although the projection, in this modification, is formed to extend in the circumferential direction of the tubular member 51, the projection may be formed to extend spirally as shown in FIG. 5, or longitudinally with respect to the tubular member 51.

Since the inside circumferential surface of each tubular member of an inter-line fishing rod which is provided in accordance with the present device is constituted by a coating film layer made of a water-repelling substance low in coefficient of friction and integrally provided on the other portion of the tubular member, the frictional resistance of the member to the fishline is so low that the fishline can be smoothly guided in the member to be put into and out of it, even if the fishline is wet with water. A desirable effect is thus produced.

What is claimed is:

1. An inter-line fishing rod in which a fishline is introduced into an inside of the rod and laid therein in the longitudinal direction of the rod, said inter-line fishing rod including at least one tubular member molded from a prepeg made of high-strength reinforcing fibers impregnated with synthetic resins, wherein:
   a film layer is provided on and substantially covers an inner circumferential surface of said tubular member to form a radially innermost layer;
   said film layer is made of a water-repelling substance low in coefficient of friction; and
   said water-repelling substance low in coefficient of friction includes at least one of fluoroplastics, silicone resins, high density polyethylene resins and synthetic waxes and said film layer has a varied thickness to define a plurality of projections each extending circumferentially with respect to said tubular member to reduce contact area between said film layer and said fishline.

2. The inter-line fishing rod according to claim 1, wherein said film layer and said tubular member are simultaneously thermally molded to form an integral body.

3. A inter-line fishing rod comprising:
   at least one tubular member molded from a prepeg made of high-strength reinforcing fibers impregnated with synthetic resins; and
   a coating film provided on and substantially covering an inner circumferential surface of said tubular member to form a radially innermost layer;
   wherein, said coating film is made of a water-repelling substance low in coefficient of friction, said water-repelling substance being low in coefficient of friction and includes at least one of fluoroplastics, silicone resins, high density polyethylene resins and synthetic waxes and said radially innermost layer has a varied thickness to define a plurality of annular projections having a longitudinal length, said annular projections being spaced apart from an adjacent annular projection by a longitudinal distance, said longitudinal length being greater than said longitudinal distance.

4. An inter-line fishing rod according to claim 3, wherein said longitudinal distance between said annular projections defines an annular groove, said radially inner most layer including a rounded transitional surface between said annular projections and said groove.

5. An inter-line fishing rod in which a fishline is introduced into an inside of the rod, said inter-line fishing rod including at least one tubular member molded from a prepeg made of synthetic resin as a matrix and reinforced with high-strength fibers,
   wherein said at least one tubular member has an inner circumferential surface defined by a recessed portion and a protruded portion alternately arranged in a sectional view; and
   wherein at least a portion of said inner circumferential surface defined by said recessed portion has a water repellant property.

6. An inter-line fishing rod as claimed in claim 5, wherein said recessed portion is defined by a coating layer, and said protruded portion is defined by high strength fibers mixed into said coating film layer and partially exposed radially inwardly from said coating film layer.

7. An inter-line fishing rod as claimed in claim 5, wherein both said recessed portion and said protruded portion are defined by a coating film layer, and the remainder of said inner circumferential surface defined by said protruded portion also has a water-repellant property.

8. An inter-line fishing rod as claimed in claim 5, wherein said recessed portion is formed of material different from a material forming said protruded portion.

9. An inter-line fishing rod as claimed in claim 5, wherein said recessed portion and said protruded portion are formed of a common material.

10. An inter-line fishing rod as claimed in claim 5, wherein said protruded portion as viewed in section has a trapezoidal shape having rounded corner portions.

11. An inter-line fishing rod in which a fishline is introduced into an inside of the rod and laid therein in the longitudinal direction of the rod, said inter-line fishing rod including at least one tubular member molded from a prepeg made of high-strength reinforcing fibers impregnated with synthetic resins, wherein:
   a film layer is provided on and substantially covers an inner circumferential surface of said tubular member to form a radially innermost layer; and
   said film layer defines a plurality of longitudinally spaced apart projections extending circumferentially with respect to said tubular member to reduce contact area between said film layer and said fishline.

12. An inter-line fishing rod according to claim 11, wherein said coating film is made of a water-repelling substance low in coefficient of friction, said water-repelling substance being low in coefficient of friction and includes at least one of fluoroplastics, silicone resins, high density polyethylene resins and synthetic waxes.

13. An inter-line fishing rod according to claim 11, wherein said plurality of longitudinally spaced apart projections are defined by a spirally extending projection along a length of said inter-line fishing rod.

14. An inter-line fishing rod having a tubular main body formed of synthetic resin as a matrix and reinforced with high-strength fibers,
wherein an inner circumferential surface of said tubular main body is formed with recessed and protruded portions alternately arranged in a longitudinal direction of said tubular main body, and thermally molded together, and
wherein surface portions defined by said recessed portions have a water repellent property.

15. An inter-line fishing rod according to claim 14, wherein surface portions defined by said protruded portions have a water repellent property.

16. An Inter-line fishing rod according to claim 14, wherein said water repellent property is obtained by at least one of low-friction water repellent materials including fluoroplastics, silicon resins, high-density polyethylene resins and synthetic waxes.

17. An inter-line fishing rod according to claim 15, wherein said water repellent property is obtained by at least one of low-friction water repellent materials including fluoroplastics, silicone resins, high-density polyethylene resins and synthetic waxes.

18. An inter-line fishing rod according to claim 14, wherein said protruded portions contain therein one of high strength fibers and anti-friction particles.

19. An inter-line fishing rad according to claim 15, wherein said protruded portions contain therein one of high-strength fibers and anti-friction particles.

20. An inter-line fishing rod according to claim 16, wherein said protruded portions contain therein one of high-strength fibers and anti-friction particles.

21. An inter-line fishing rod according to claim 17, wherein said protruded portions contain therein one of high-strength fibers and anti-friction particles.

22. An inter-line fishing rod according to claim 14, wherein said recessed portions contain therein one of high-strength fibers and anti-friction particles.

23. An inter-line fishing rod according to claim 15, wherein said recessed portions contain therein one of high-strength fibers and anti-friction particles.

24. An inter-line fishing rod according to claim 16, wherein said recessed portions contain therein one of high-strength fibers and anti-friction particles.

25. An inter-line fishing rod according to claim 17, wherein said recessed portions contain therein one of high-strength fibers and anti-friction particles.

26. An inter-line fishing rad according to claim 14, wherein each of said protruded portions has rounded corners as viewed in a longitudinal section.

27. An inter-line fishing rod according to claim 15, wherein each of said protruded portions has rounded corners as viewed in a longitudinal section.

28. An Inter-line fishing rod according to claim 16, wherein each of said protruded portions has rounded corners as viewed in a longitudinal section.

29. An inter-line fishing rod according to claim 17, wherein each of paid protruded portions has rounded corners as viewed in a longitudinal section.

30. An inter-line fishing rod according to claim 18, wherein each of said protruded portions has rounded corners as viewed in a longitudinal section.

31. An inter-line fishing rad according to claim 19, wherein each of said protruded portions has rounded corners as viewed in a longitudinal section.

32. An inter-line fishing rod according to claim 20, wherein each of said protruded portions has rounded corners as viewed in a longitudinal section.

33. An inter-line fishing rod according to claim 21, wherein each of said protruded portions has rounded corners as viewed in a longitudinal section.

34. An inter-line fishing rod according to claim 14, wherein said protruded portions form a spiral projection extending spirally along said longitudinal direction of said tubular main body.

35. An inter-line fishing rod according to claim 15, wherein said protruded portions form a spiral projection extending spirally along said longitudinal direction of said tubular main body.

36. An inter-line fishing rod according to claim 16, wherein said protruded portions form a spiral projection extending spirally along said longitudinal direction of said tubular main body.

37. An inter-line fishing rod according to claim 17, wherein said protruded portions form a spiral projection extending spirally along said longitudinal direction of said tubular main body.

38. An inter-line fishing rad according to claim 18, wherein said protruded portions form a spiral projection extending spirally along said longitudinal direction of said tubular main body.

39. An inter-line fishing rod according to claim 19, wherein said protruded portions form a spiral projection extending spirally along said longitudinal direction of said tubular main body.

40. An inter-line fishing rod according to claim 20, wherein said protruded portions form a spiral projection extending spirally along said longitudinal direction of said tubular main body.

41. An inter-line fishing rod according to claim 21, wherein said protruded portions form a spiral projection extending spirally along said longitudinal direction of said tubular main body.

42. An inter-line fishing rod according to claim 26, wherein said protruded portions form a spiral projection extending spirally along said longitudinal direction of said tubular main body.

43. An inter-line fishing rod according to claim 27, wherein said protruded portions form a spiral projection extending spirally along said longitudinal direction of said tubular main body.

44. An inter-line fishing rod according to claim 28, wherein said protruded portions form a spiral projection extending spirally along said longitudinal direction of said tubular main body.

45. An inter-line fishing rod according to claim 29, wherein said protruded portions form a spiral projection extending spirally along said longitudinal direction of said tubular main body.

46. An inter-line fishing rod according to claim 30, wherein said protruded portions form a spiral projection extending spirally along said longitudinal direction of said tubular main body.

47. An inter-line fishing rod according to claim 31, wherein said protruded portions form a spiral projection extending spirally along said longitudinal direction of said tubular main body.

48. An inter-line fishing rod according to claim 32, wherein said protruded portions form a spiral projection extending spirally along said longitudinal direction of said tubular main body.

49. An inter-line fishing rod according to claim 33, wherein said protruded portions form a spiral projection extending spirally along said longitudinal direction of said tubular main body.

* * * * *